United States Patent [19]

Sollers et al.

[11] Patent Number: 5,552,449
[45] Date of Patent: Sep. 3, 1996

[54] POLYURETHANE FOAM BASED ON COMBINATION OF POLYESTER RESIN AND POLYETHER POLYOL

[75] Inventors: Joseph S. Sollers, Lutherville; Roland N. Fracalossi; Walter V. V. Greenhouse, both of Baltimore; George J. Tolen, Ellicott City, all of Md.

[73] Assignee: Wm. T. Burnett & Co., Inc., Baltimore, Md.

[21] Appl. No.: 353,996

[22] Filed: Dec. 6, 1994

Related U.S. Application Data

[63] Continuation of Ser. No. 688,330, Apr. 22, 1991.

[51] Int. Cl.$^6$ ................................................. C08G 18/14
[52] U.S. Cl. ........................... 521/155; 521/172; 521/173; 521/174; 521/176
[58] Field of Search ..................................... 521/155, 172, 521/173, 174, 176

[56] References Cited

U.S. PATENT DOCUMENTS

| | | | |
|---|---|---|---|
| 4,076,654 | 2/1978 | Yukuta et al. | 521/130 |
| 4,077,920 | 3/1978 | Yukuta et al. | 521/164 |
| 4,098,732 | 7/1978 | Yukuta et al. | 521/167 |
| 4,243,755 | 1/1981 | Marx et al. | 521/137 |
| 4,374,935 | 2/1983 | Decker et al. | 521/173 |
| 4,581,432 | 4/1986 | Blum et al. | 521/161 |
| 4,703,069 | 10/1987 | Brown et al. | 521/174 |
| 5,001,165 | 3/1991 | Canaday et al. | 521/173 |

OTHER PUBLICATIONS

Grant & Hackh's; Chemical Dictionary, 1987; 5th Edition, p. 265.

*Primary Examiner*—James J. Seidleck
*Assistant Examiner*—John M. Cooney, Jr.
*Attorney, Agent, or Firm*—Breiner & Breiner

[57] ABSTRACT

Flexible polyurethane foams based on a blend of polyether and polyester polyols are described. The polyurethane foams of the invention have at least one of (a) enhanced pourability of a predominantly polyether foam; (b) flame laminability to a predominantly polyether foam without having as an essential ingredient an additive; (c) improved flame retardancy of a predominantly polyether or polyester foam; (d) improved hydrolytic stability to a predominantly polyester foam, or (e) increased softness to a predominantly polyether or polyester foam.

10 Claims, No Drawings

POLYURETHANE FOAM BASED ON COMBINATION OF POLYESTER RESIN AND POLYETHER POLYOL

This is a continuation of co-pending application Ser. No. 07/688,330 filed on Apr. 22, 1991.

FIELD OF THE INVENTION

This invention relates to flexible polyurethane foams. More particularly, the invention relates to flexible polyurethane foams based on a mixture of polyether polyols and polyester resins which, surprisingly, have unique characteristics including good softness, good flame laminability with reduced smoke, freedom from holes, and good hydrolytic stability.

BACKGROUND OF THE INVENTION

The usage of polyurethane foams has greatly increased in the last ten years due to innovations and improvements leading to enhanced physical properties. These enhanced physical properties include flame retardation characteristics and the production of foams which do not drip when subjected to high heat. These polyurethane foams are based on the reaction of a polyisocyanate, such as toluene diisocyanate, and either a polyether or polyester polyol. For convenience herein, at times "polyether polyols" will simply be referred to by the term "polyol," and "polyester polyols" will be referred to by the term "resin" or polyester resin.

In the art it is generally recognized that polyether polyols conventionally have a greater functionality than polyester resins, i.e., polyether polyols are predominantly trifunctional and polyester resins are predominantly difunctional. Similarly, it is generally accepted that polyurethane foams based on polyester resins, because of the ester linkages, tend to hydrolyze and, accordingly, are unacceptable for certain usages, for example where the foams are subjected to moist or humid environments. It is also generally accepted that polyether-based polyurethane foams have poor flame laminating characteristics. Moreover, it is known that polyether polyols, because of their lower viscosity, are more difficult to pour or lay down on a foaming surface without splashing during pour. This splashing has a tendency to trap air in the foam-forming mixture as it is being poured, forming air bubbles in the foaming mixture as it commences rising. These air bubbles cause holes in the final foam product which is detrimental to many applications, particularly those involving thin sections of foam.

It is recognized in the art that the softness of a foam, including a polyether foam, can be increased by reducing the amount of polyisocyanate used in the foam-forming reaction mixture. It is also recognized, however, that below a certain minimum level of diisocyanate, the foam characteristics are damaged, including to the extent that the foams do not have good structural integrity. It also has been recognized that the softness of foams can be increased by utilizing select blowing agents, such as the chloro-fluoro carbons. Chloro-fluoro carbons, however, are now substantially unacceptable as foaming agents because of their effect on the ozone layer. It is also possible to provide polyether foams having good flame laminability characteristics. However, all such flame laminable polyether-based polyurethane foams must have additives present which increases the cost of the foams and also leads to greater difficulty in the production of the foams.

Accordingly, in spite of all of the recent innovations in the preparation of polyurethane foams there is still a need for polyether foams wherein the splash characteristics are reduced or eliminated which, in turn, will provide a hole-free polyether foam. There is also a need for polyether foams having increased softness without affecting the physical characteristics of the foam and without use of blowing agents which have a damaging effect on the environment. There is also a need for polyether foams which are flame laminable and which pass stringent flammability tests without having additives which increase the foam costs and complexity of the foam-producing operation. Finally, there is a need for polyester foams having improved hydrolytic stability. The present invention provides foams having all of these desirable characteristics.

SUMMARY OF THE INVENTION

The present invention is based on the discovery that by blending polyester resins with polyether polyols in a range of from about 10 parts polyether to 90 parts polyester, or 90 parts polyether to 10 parts polyester, and preferably 20 parts polyether to 80 parts polyester, or 80 parts polyether to 20 parts polyester, greatly enhanced characteristics can be obtained in the finished foam. Thus, it has been found that foams based predominantly on polyether polyols can be produced having softness characteristics substantially similar to the softness characteristics of a polyether-based foam made with chloro-fluoro carbons while maintaining the structural integrity of the foam. It has further been found that by utilizing a mixture of the polyether polyol and polyester resin the foam mixture can be poured without splash, producing a foam having the desired characteristics of a polyether-based foam without having holes commonly associated with polyether foams. Moreover, it has been found that foams based predominantly on polyester resins having enhanced hydrolytic stability can be obtained. Most surprisingly, it has been found that the use of a minor amount of polyester resin in a polyether-based foam produces a foam which has good flame laminable characteristics without addition of other additives.

The improved properties are surprising since heretofore there has been no suggestion in the art of using a mixture of polyester resins and polyether polyols in polyurethane foams to obtain enhanced results. Where mixtures of polyether polyols and polyester resins have been utilized, an additional component has also been added. Thus, U.S. Pat. No. 3,884,848 discloses flexible polyurethane foams prepared from a reaction mixture including a polyether polyol or a polyester polyol admixed with at least 2% by weight of a polyether polyol in combination with a cell opener having the formula $(RCOO)_n R'$ in a suitable proportion whereby a non-lustrous, substantially membrane-free foam is obtained. In the preceding formula R and R' are alkyl or alkenyl groups having from one to 30 carbon atoms, at least one of R and R' having at least three carbon atoms, and n being an integer from 1 to 3, with the proviso that when n is one at least one of R and R' has at least eight carbon atoms. Although the '848 patent includes comparative examples wherein a polyester foam contains up to 15% of a polyether polyol, these comparative examples establish that the foam without the additive does not have good flame laminating characteristics or good air permeability characteristics obtainable when the cell opener is present. Accordingly, the aforesaid disclosure is not an enabling disclosure of polyurethane foams based on a mixture of polyether polyol and polyester resin to obtain enhanced characteristics. Rather, the disclosure of the patent would tend to teach away from polyurethane foams based on a mixture, at least unless an additional component is utilized.

According to the present invention, the basic foam-forming components of the flexible polyurethane foam are a diisocyanate and a conventional polyol which are the polyether polyols and polyester polyols, including block polymers of polyether and polyester polyols reactive with a diisocyanate under the conditions of the foam-forming reaction. The foaming formulations will include various conventional foaming catalysts, surfactants, antioxidants, and the like. The range of molecular weight and range of hydroxyl numbers on the reactive polyols is consistent with the production of flexible foams. Specifically, the molecular weight is from about 1500 to 2000 up to about 6500 to 7000. The hydroxyl number range is from about 20 to 25 up to about 130, and preferably from about 20 to 25 to about 100. As is known in the art, a flexible polyurethane foam can be produced by adjusting the polyol and diisocyanate to each other and/or in the presence of low molecular weight crosslinking or curing agents. Additionally, the flexibility characteristics of a polyurethane foam can be modified by using the isocyanate in less than its stoichiometric amounts. "Flexible foam," as used throughout this specification, has the meaning of a flexible foam as set forth in "Polyurethanes: Chemistry and Technology, Part II Technology," J. H. Saunders & K. C. Frisch, Interscience Publishers, 1964, pages 117 to 159. These flexible foams can have varying degrees of firmness determined by the density characteristics. It is also possible to include blowing agents to enhance the foaming operation. Since the various materials used are well known to those skilled in the art of polyurethane foams, they will not be described in detail.

The diisocyanates which are to be employed in accordance with the present invention are those conventional to a polyurethane foam system. They include compounds having the general formula R-(NCX)$_z$, where X may be oxygen or sulfur, z an integer of one or more, and R an organic radical. These isocyanates, therefore, may be either aromatic or aliphatic, or mixed aromatic-aliphatic products. Although it is necessary to have more than 50% of z in these reactions equal to at least two to promote polymerization, monofunctional compounds are often desirable to modify the product. Preferred isocyanates are toluene 2,4 diisocyanate, toluene 2,6 diisocyanate, methylene bis(4-phenyl-isocyanate), 3,3'bitoluene, 4,4'diisocyanate, hexamethylenediisocyanate, and octyldecylisocyanate. This preference is based on the commercial availability of such compounds. However, ethylene diisocyanate, trimethylene diisocyanate, tetramethylene diisocyanate, decamethylene diisocyanate, heptylidene diisocyanate, and the corresponding diisothiocyanates; cycloalkylene diisocyanates and diisothiocyanates, e.g., cyclopentylene diisocyanate, cyclohexylene diisocyanate; aromatic diisocyanates and diisothiocyanates, e.g., m-phenylene diisocyanate, naphthalene diisocyanate, and diphenyl- 4,4'-diisocyanate; aliphatic-aromatic diisocyanates and diisothiocyanates, e.g., xylene-1,4-diisocyanate and 4,4'-diphenylenemethane diisocyanate; heterocyclic diisocyanates and diisothiocyanates, such as SCNCH$_2$OCH$_2$NCS and SCN(CH$_2$)$_3$—S—(CH$_2$)$_3$NCS; the isocyanates and isothiocyanates containing more than two functional groups, e.g., benzene 1,2,4-triisothiocyanate, 1,2,2-triisocyanatobutane, toluene triisocyanate; and as modifiers, the monoisocyanates and monothioisocyanates, e.g., octylisocyanate and octadecylisocyanate, can be selected.

The foam formulations of this invention must include a foam-stabilizing organo-silicone emulsifier which is an organo-silicone compound, usually a polymer, which is hydrophilic and preferably water-soluble as well as soluble in at least one of the polyols. Such organo-silicone surfactant-emulsifiers are well known to the art and are described in the published literature and sold commercially. The commercially available organo-silicone surfactant-emulsifiers are generally sold with specific instructions as to their suitability for polyether polyol-type or for polyester polyol-type polyurethane foam production. Generally, a surfactant-emulsifier suitable for one polyol type is not suitable for use in a foaming reaction based on the other type. The surfactant-emulsifiers used for polyether polyol-containing reaction mixtures are known to depress the surface tension to a greater extent than do the organo silicone surfactants used with polyester polyols. In the process of the present invention where the polyurethane foam is prepared from a reaction mixture containing a polyether polyol and a polyester polyol, it is surprising that the surfactant-emulsifiers which are most effective are the type commonly used with polyether polyols.

DETAILED DESCRIPTION OF THE INVENTION AND PRESENTLY PREFERRED EMBODIMENTS

To more fully illustrate the present invention, a number of preferred embodiments will be set forth. These embodiments will establish that the foam-forming components can be those conventionally used in the art including the polyester polyols, polyether polyols, grafted polymer polyols of ethers and esters, and mixtures thereof. It is to be understood, however, that these examples are illustrative only and are not set forth as being limiting. Parts are by weight throughout unless otherwise designated. The following select components are used in the examples:

M-7057 is a polyether polyol having a molecular weight of about 3000 produced by the reaction of a mixture of propylene oxide and ethylene oxide with glycerol, marketed by Mobay Chemical Corporation, Pittsburgh, Pa.

P-994 Polyether Polyol is obtained by grafting styrene and acrylonitrile onto a polyether backbone to provide a polyether having essentially secondary hydroxyl groups, marketed by BASF Corporation, Wyandotte, Mich.

P-924 Polyether Polyol is a polyoxyethylene/polyoxypropylene polymer with the polyoxypropylene being present in the major amount, marketed by BASF Corporation, Wyandotte, Mich.

E-737 Polyether Polyol additive is an alkylene-modified oxyalkylene polymer, marketed by AC West Virginia Polyol Company, South Charleston, West Virginia.

Fomrez-53 is a polyester polyol based on adipic acid and diethylene glycol utilizing a glycerol branching agent, and has a molecular weight of approximately 2000, marketed by Witco Chemical Company.

Fomrez-76 is a polyester polyol similar to Fomrez-53 having a higher hydroxyl content, and thus a greater reactivity, and a molecular weight of approximately 2000–2500, marketed by Witco Chemical Company.

Antiblaze 195 is tri-(1,3-dichloro-2-propyl) phosphate, marketed by Albright & Wilson Americas Inc., Richmond, Va.

L-5810 is a silicone surfactant and is polyalkylene-oxidemethylsiloxane copolymer compatible with a polyether polyol foaming system, marketed by Union Carbide Chemicals and Plastics Company, Inc.

L-620 is a silicone surfactant substantially similar to L-5810, marketed by Union Carbide Chemicals and Plastics Company, Inc.

L-536 is a silicone surfactant of the cyano-substituted polyalkylene oxide methyl siloxane-type, as described in U.S. Pat. No. 4,031,042, marketed by Union Carbide Chemicals and Plastics Company, Inc.

NIAX Catalyst A-200 is a tertiary amine/glycol mixture, marketed by Union Carbide Chemicals and Plastics Company, Inc.

NIAX Catalyst A-4 is a tertiary amine/amide, polyalkylene oxide alcohol mixture, marketed by Union Carbide Chemicals and Plastics Company, Inc.

DABCO DM-9793 is an organo-tin compound in an organic diluent, marketed by Air Products and Chemicals, Inc., Allentown, Pa. This type of compound is commonly referred to as a tin catalyst.

FYROL FR-2 Flame Retardant is tri (1,3-dichloro-isopropyl) phosphate, marketed by Akzo Chemicals Inc., Chicago, Ill.

FYROL PBR Flame Retardant is pentabromodiphenyl oxide mixed with a triphenyl phosphate, marketed by Akzo Chemicals Inc., Chicago, Ill.

FYROL E-85042 (FYROL E-42) additive is a blend of aryl phosphate and phosphites, and contains triphenyl phosphate, marketed by Akzo Chemicals, Inc., Chicago, Ill.

HCFC-123 is dichlorotrifluoroethane, marketed by dupont Corporation, Wilmington, Del.

NEM is N-ethylmorpholine.

B16 is dimethylcetylamine.

Example 1

This example illustrates a polyurethane foam having flame-retardant characteristics utilizing a major amount of polyether polyol and a minor amount of polyester resin.

| Parts | |
|---|---|
| 80 | Polyether Polyol (M-7057) |
| 20 | Polyester Resin (Fomrez-53) |
| 49 | Toluene Diisocyanate (TDI) |
| 9 | FYROL FR-2 Flame Retardant |
| 6 | FYROL PBR Flame Retardant |
| 1.23 | Dichlorotrifluoroethane (HCFC-123) |
| .35 | NIAX Catalyst A-200 |
| .35 | NIAX Catalyst A-4 |
| 1.00 | DABCO DM-9793 Catalyst |
| 1.00 | Silicone Surfactant (L-5810) |
| 4.00 | Water |

All of the components were thoroughly mixed in a foam-mixing head and poured onto a foaming surface. The foam mixture during pouring was a smooth homogeneous mixture and was applied to the pouring surface without splashing. The foam produced was uniform, and when peeled on a foam-peeling machine to thicknesses of 1/16" provided foam sheeting which was free of holes and could be readily flame laminated to a textile surface. There was little or no smoke produced during the laminating. The same formulation without the polyester resin contained holes as a result of splashing during pouring and could not be flame laminated. The foam passed the California Technical Bulletin 117 Flame Retardancy Tests, Parts A and D ("California Test"), as well as Federal Motor Vehicle Safety Standard No. 302.

Example 2

This example illustrates a polyurethane foam utilizing a major amount of polyether polyol and a minor amount of polyester resin which can be flame laminated.

| Parts | |
|---|---|
| 80 | Polyether Polyol (M-7057) |
| 20 | Polyester Resin (Fomrez-53) |
| 49 | Toluene Diisocyanate (TDI) |
| 1.0 | Silicone Surfactant (L-5810) |
| 1.25 | Dichlorotrifluoroethane (HCFC-123) |
| .35 | NIAX Catalyst A-200 |
| .35 | NIAX Catalyst A-4 |
| 1.00 | DABCO DM-9793 Catalyst |
| 4.00 | Water |

The components were foamed as in Example 1. The foam produced had good flame laminable characteristics and, additionally, when peeled was free of holes. The same formulation without the polyester resin could not be flame laminated, was substantially firmer, and contained air holes caused by splash during pouring of the foaming mixture on the foaming surface.

Example 3

This example illustrates a further polyurethane foam having flame retardancy utilizing a major amount of polyether polyol and a minor amount of polyester resin.

| Parts | |
|---|---|
| 40 | Polyether Polyol (M-7057) |
| 40 | Polyether Polyol (P-994) |
| 20 | Polyester Resin (Fomrez-53) |
| 51 | Toluene diisocyanate (TDI) |
| 8.6 | FYROL E-42 Additive |
| 16 | Antiblaze 195 |
| 0.98 | Silicone Surfactant (L-5810) |
| 1.00 | Dichlorotrifluoroethane (HCFC-123) |
| .30 | NIAX Catalyst A-200 |
| .50 | DABCO DM-9793 Catalyst |
| 3.60 | Water |

The components were foamed as in Example 1. The foam produced was flame laminable to a textile when peeled and was free of holes. The same formulation without the polyester resin contained many pour holes and was substantially firmer.

Example 4

This example illustrates a further polyurethane foam having flame retardancy utilizing a major amount of polyether polyol and a minor amount of polyester resin.

| Parts | |
|---|---|
| 80 | Polyether Polyol (M-7057) |
| 10 | Additive E-737 |
| 20 | Polyester Resin (Fomrez-53) |
| 52.17 | Toluene Diisocyanate (TDI) |
| 1.00 | Silicone Surfactant (L-5810) |
| 1.25 | Dichlorotrifluoroethane (HCFC-123) |
| .35 | NIAX Catalyst A-200 |
| .35 | NIAX Catalyst A-4 |
| 1.00 | DABCO DM-9793 Catalyst |
| 4.00 | Water |

The components were foamed as in Example 1. The foam produced was flame laminable to a textile when peeled and was free of holes. The same formulation without the polyester resin contained many pour holes and was substantially firmer.

Examples 5–9

These examples illustrate polyurethane foams based predominantly on polyether polyols with a lesser amount of polyester resin showing the effects of lowering the diisocyanate content of the reaction mixture.

| Parts | |
|---|---|
| 55 | Polyether Polyol (P-924) |
| 45 | Polyester Resin (Fomrez-53) |
| Varied | Toluene Diisocyanate (TDI) |
| 1.00 | Silicone Surfactant (L-5810) |
| .40 | NIAX Catalyst A-200 |
| .50 | NEM |
| Varied | DABCO DM-9793 Catalyst |
| 4.00 | Water |

All of Examples 5–9 were the same except for the adjustment of the TDI content and tin catalyst. In Example 5, TDI content was 50.55 parts and tin catalyst was 0.4; in Example 6, TDI content was 45.95 parts and tin catalyst was 0.55; in Example 7, TDI content was 43.65 parts and tin catalyst was 0.85; in Example 8, TDI content was 41.36 parts and tin catalyst was 1.0; and in Example 9, TDI content was 36.76 parts and tin catalyst was 1.5. Each of Examples 5–8 provides foam when foamed as in Example 1 which was progressively softer and was free of holes. Example 9, because of the extremely low TDI content, contained voids and poor structural integrity.

Examples 10–12

Examples 10 and 11 illustrate polyurethane foams based predominantly on polyester resins as the polyol with minor amounts of polyether polyol. Example 12 is a comparative example with no polyether polyol.

| | Parts | | |
|---|---|---|---|
| | Ex 10 | Ex 11 | Ex 12 |
| Polyester Resin (Fomrez-76) | 80 | 90 | 100 |
| Polyether Polyol (P-924) | 20 | 10 | 0 |
| TDI | 51.55 | 51.77 | 51.77 |
| NEM | 1.20 | 1.20 | 0.8 |
| B16 | 0 | 0.40 | 0.2 |
| Silicone Surfactant (L-620) | 1.0 | 1.50 | 0 |
| Silicone Surfactant (L-536) | 0 | 0 | 1.0 |
| DABCO DM-9793 | 0.4 | 0.6 | 0.40 |
| Water | 4.0 | 4.0 | 4.0 |

These formulations when foamed as in Example 1 gave foams with the following characteristics:

TABLE 1

| | Ex 10 | Ex 11 | Ex 12 |
|---|---|---|---|
| Cured Density (PCF) | 1.47 | 1.52 | 1.50 |
| Clickability | Good | Good | Good |
| Tensile Strength (PSI) | 20.8 | 24.1 | 20.0 |
| Tensile Elongation (%) | 324 | 292 | 100 |
| Tear Resistance (PPI) | 4.02 | 4.42 | 1.50 |
| Air Flow (SCFM) | | | |
| Top to Bottom | 7.17 | 9.33 | 1.5 |
| | 7.17 | 9.33 | 0.8 |
| | 6.50 | 9.33 | 0.7 |
| | 6.67 | 9.17 | 0.5 |
| | 4.67 | 6.17 | 0.3 |
| Compression Force Deflection (Softness) | | | |

TABLE 1-continued

| | Ex 10 | Ex 11 | Ex 12 |
|---|---|---|---|
| (PSI) 25% | .25 | .39 | .60 |
| (PSI) 50% | .32 | .48 | .75 |
| (PSI) 70% | .55 | .90 | 1.70 |

As shown in Table 1, the presence of the polyether polyol greatly increased the foam softness, tensile elongation, tear resistance, and air flow.

Example 13

This example illustrates a foam having substantially equal amounts of polyether polyol and polyester resins.

| | Parts |
|---|---|
| Polyester Resin (Fomrez-76) | 45 |
| Polyether Polyol (P-924) | 55 |
| TDI | 51.66 |
| NEM | 0.80 |
| NIAX A-200 | 0.40 |
| DABCO DM-9793 | 0.40 |
| Silicone Surfactant (L-620) | 1.0 |
| Water | 4.0 |

A foam made from this formulation by the procedure described in Example 1 had excellent hydrolytic stability, good sealing properties, and excellent acoustical characteristics. The foam was used in a sound system speaker as a surround for the speaker cone. A foam based on polyether alone does not have the acoustical characteristics, and a foam made from polyester alone does not have hydrolytic stability when the speaker is used in humid conditions.

The aforesaid examples illustrate—

(a) that the blending process controls "splash" during pour in polyethers, which greatly reduces the number of holes in the foam caused by entrapped air;

(b) that formulations of polyether/polyester blends are flame-laminable without additives which interfere with other properties;

(c) ethers blended with esters improve the hydrolytic stability of polyester foam;

(d) the blending of polyesters with polyethers improves physical and flame test characteristics of the polyether foams; and (e) increased softness to a predominantly polyether or polyester foam.

These enhanced characteristics are totally unpredictable based on the prior art.

In the aforesaid examples various modifications can be made including the use of other and additional additives, modified catalysts, and fire retardants. These modifications will be apparent to one skilled in the art. Such modifications being within the ability of one skilled in the art form a part of the present invention and are embraced by the appended claims.

It is claimed:

1. A flexible polyurethane foam comprising the foam-forming reaction product of water as a foaming agent, a diisocyanate, a blend of polyether polyol and polyester pelyol which are immiscible with each other, and a foam stabilizing organo-silicone emulsifier; the ratio of polyether polyol to polyester polyol being from about 90:10 to 10:90, and said polyester polyol being based on a dicarboxylic acid and diethyleneglycol, each of said polyols having a molecular weight of from about 1500 to about 7000 and being present in an amount sufficient to impart to said flexible polyurethane foam produced increased softness relative to a flexible polyurethane foam produced solely from a polyether or polyester polyol.

2. The flexible polyurethane foam of claim 1 wherein the ratio of polyether polyol to polyester polyol is from about 80:20 to 20:80.

3. The flexible polyurethane foam of claim 2 wherein the polyether polyol is a polyoxyethylene/polyoxypropylene polymer extended from a starting diol or triol, with the polyoxypropylene being present in a major amount.

4. The flexible polyurethane foam of claim 3 wherein the polyoxyethylene/polyoxypropylene polymer is grafted.

5. The flexible polyurethane foam of claim 2 wherein the polyester polyol is a polyester based on a dicarboxylic acid, diethyleniglycol, a minor amount of triol, and having a molecular weight below about 5000.

6. The flexible polyurethane foam of claim 5 wherein the dicarboxylic acid is adipic acid, diethyleneglycol, the triol is glycerine, and the molecular weight is approximately 2000.

7. The method of forming a flexible polyurethane foam comprising blending water as a foaming agent, a diisocyanate, a polyether polyol, a polyester polyol, and a foam-stabilizing organo-silicone emulsifier, the ratio of said polyether polyol to polyester polyol which are immiscible with each other being from about 90:10 to 10:90, said polyether polyol and polyester polyol having a molecular weight of from about 1500 to about 7000, with said polyester polyol being based on a dicarboxylic acid and diethyleneglycol and said polyols being present in an amount sufficient to impart to said flexible polyurethane foam produced increased softness relative to a flexible polyurethane foam produced solely from a polyether or polyester foam.

8. The method of claim 7 wherein the ratio of polyether polyol to polyester polyol is from about 80:20 to 20:80.

9. The method of claim 8 wherein the polyether polyol is a polyoxyethylene/polyoxypropylene polymer extended from a starting diol or triol, with the polyoxypropylene being present in a major amount.

10. The method of claim 9 wherein the polyester polyol is a polyester based on a dicarboxylic acid and diethyleneglycol, and having a molecular weight below about 5000.

* * * * *